US012627363B2

(12) United States Patent
Elad et al.

(10) Patent No.: US 12,627,363 B2
(45) Date of Patent: May 12, 2026

(54) NON-CASCADING MIMO CHANNEL EXTENDERS FOR RADAR CHIPS

(71) Applicant: AyDeeKay LLC, Aliso Viejo, CA (US)

(72) Inventors: Danny Elad, Kibutz Matsuva (IL); Dan Corcos, Tel Aviv (IL)

(73) Assignee: Ay Dee Kay LLC, Aliso Viejo, CA (US)

( * ) Notice: Subject to any disclaimer, the term of this patent is extended or adjusted under 35 U.S.C. 154(b) by 468 days.

(21) Appl. No.: 18/118,681

(22) Filed: Mar. 7, 2023

(65) Prior Publication Data

US 2023/0231615 A1 Jul. 20, 2023

Related U.S. Application Data

(63) Continuation-in-part of application No. 17/160,915, filed on Jan. 28, 2021, now Pat. No. 11,796,630.

(51) Int. Cl.
H04B 7/06 (2006.01)
H04B 1/00 (2006.01)

(52) U.S. Cl.
CPC ......... H04B 7/0697 (2013.01); H04B 1/0082 (2013.01); H04B 7/0691 (2013.01)

(58) Field of Classification Search
CPC ...... G01S 13/345; G01S 13/006; G01S 7/354; G01S 13/584; G01S 17/34; G01S 17/58; G01S 13/34; G01S 7/02; G01S 7/415
See application file for complete search history.

(56) References Cited

U.S. PATENT DOCUMENTS

| | | | |
|---|---|---|---|
| 9,182,485 B1* | 11/2015 | Andrews | G01S 13/426 |
| 9,608,756 B2* | 3/2017 | Chang | H04B 7/2041 |
| 2008/0089207 A1 | 4/2008 | Koreeda et al. | |
| 2018/0267144 A1* | 9/2018 | Lin | G01S 7/4021 |
| 2019/0178983 A1 | 6/2019 | Lin et al. | |
| 2019/0372218 A1* | 12/2019 | Vehovc | H04B 17/12 |
| 2021/0072369 A1 | 3/2021 | Heller et al. | |
| 2021/0266052 A1* | 8/2021 | Fernando | H04B 3/54 |
| 2022/0236372 A1 | 7/2022 | Elad et al. | |
| 2022/0239010 A1 | 7/2022 | Hormis et al. | |

OTHER PUBLICATIONS

PCT Patent Appl. Serial No. PCT/US23/017090, International Search Report and Written Opinion, May 8, 2024.

* cited by examiner

*Primary Examiner* — William Kelleher
*Assistant Examiner* — Ismaaeel A. Siddiquee
(74) *Attorney, Agent, or Firm* — Steven Stupp

(57) ABSTRACT

A receive extender in an integrated circuit may include: N phase-adjustment circuits that adjust phases of N receive signals from N receive antennas; and an N:1 demultiplexer that coherently combines the N receive signals into an output signal, which is provided to the transceiver chip. Moreover, a transmit extender in the integrated circuit may include: a 1:M multiplexer that coherently separates a transmit signal from the transceiver chip into M transmit signals, where N and M are non-zero integers that may be different; and M phase-adjustment circuits that adjust phases of the M transmit signals, which are provided to M transmit antennas. Note that the integrated circuit may be coupled to a second integrated circuit that phase shifts the output signal and the transmit signal based at least in part on the oscillator signal. Moreover, control signals between the integrated circuit and the second integrated circuit may be synchronized.

20 Claims, 15 Drawing Sheets

NON-CASCADING MIMO CHANNEL EXTENDERS FOR RADAR CHIPS

CROSS REFERENCE TO RELATED APPLICATIONS

This application is a continuation-in-part of U.S. Non-provisional application Ser. No. 17/160,915, entitled "MIMO Channel Extenders with Associated Systems and Methods," by Danny Elad, et al., filed on Jan. 28, 2021, the contents of which are herein incorporated by reference.

The application relates to the following applications: U.S. patent application Ser. No. 16/801,406, filed Feb. 26, 2020, entitled "MIMO Radar with Receive Antenna Multiplexing," by Danny Elad, et al.; U.S. patent application Ser. No. 16/583,663, filed Sep. 26, 2019, entitled "Multi-Input Downconversion Mixer," by Benny Sheinman; and U.S. patent application Ser. No. 16/203,149, filed Nov. 28, 2018, entitled "Reconfigurable MIMO Radar," by Danny Elad, et al., the contents of each of which is hereby incorporated by reference.

FIELD

The present disclosure relates to techniques for using extender chips to increase the number of transmitters and receivers in multiple-input multiple-output (MIMO) radar systems.

BACKGROUND

In order to provide improved safety and more-convenient transportation options, many automotive manufacturers are including additional sensors and/or features in their vehicles. For example, self-driving cars typically include a wide variety of sensors, such as acoustic and/or electromagnetic sensors that monitor the surrounding environment to detect other vehicles, people, animals, or obstacles. However, many of the sensors (such as MIMO radar systems), which can include a large number of transmitters and receivers, remain cost prohibitive.

SUMMARY

The shortcomings identified above may be addressed at least in part by MIMO radar systems with channel extenders to further increase the number of receive and/or transmit antennas that can be supported by a given radar transceiver. One illustrative radar system includes: a radar transceiver to generate a transmit signal and to down convert at least one receive signal; and a receive-side extender that couples to a set of multiple receive antennas to obtain a set of multiple input signals, that adjustably phase-shifts each of the multiple input signals to produce a set of phase-shifted signals, and that couples to the radar transceiver to provide the at least one receive signal, the at least one receive signal being a sum of the phase-shifted signals.

An illustrative receive-side extender includes: a set of multiple phase shifters each providing an adjustable phase shift to a respective input signal; a power combiner that forms a receive signal by combining outputs of the multiple phase shifters; and an internal memory that stores, for each of the multiple phase shifters, a different sequence of phase shift adjustments. The receive-side extender may further include an external interface that controls timing for supplying the different sequences from the memory to the multiple phase shifters.

An illustrative transmit-side extender includes: a power splitter that splits the respective transmit signal into multiple signal copies; a set of multiple phase shifters each providing an adjustable phase shift for one of the multiple signal copies; a set of power amplifiers each deriving one of the multiple output signals from an output of a corresponding one of the multiple phase shifters; and an internal memory that stores, for each of the multiple phase shifters, a different sequence of phase shift adjustments. The transmit-side extender may further include an external interface that controls timing for supplying the different sequences from the memory to the multiple phase shifters.

An illustrative radar detection method includes: generating a chirp waveform; deriving a transmit signal from the chirp waveform; obtaining a set of multiple input signals from a set of multiple receive antennas; applying adjustable phase shifts to each of the multiple input signals to provide multiple phase-shifted input signals; summing the multiple phase-shifted input signals to form a receive signal; combining the receive signal with the chirp waveform to obtain a down-converted receive signal; deriving a set of digital input signals from the down-converted receive signal; and processing the set of digital input signals to determine reflection energy as a function of distance or travel time.

The illustrative system, extenders, and method may be employed individually or conjointly, together with one or more of the following optional features in any suitable combination: 1. the transmit signal includes a sequence of chirps. 2. the receive-side extender adjusts the phase shifts for the multiple input signals once for each chirp. 3. the adjusted phase shifts provide progressive phase shifts to the multiple input signals for beam steering. 4. the adjusted phase shifts provide code division multiplexing of the multiple input signals. 5. the radar transceiver processes the at least one down-converted receive signal to obtain a demultiplexed set of digital input signals. 6. the receive-side extender adjusts the phase-shifts for the multiple input signals multiple times during each chirp. 7. the adjusted phase shifts provide different frequency shifts, different frequency sweep rates, or different code modulations to the multiple input signals. 8. one or more transmit-side extenders that each couple to the radar transceiver to obtain a respective transmit signal and each couple to a respective set of multiple transmit antennas to provide a set of multiple output signals, each of the multiple output signals having an adjustable phase shift. 9. the transmit-side extender adjusts the phase-shifts for the multiple output signals once for each chirp. 10. the adjusted phase shifts provide the multiple output signals with progressive phase shifts for beam steering. 11. the adjusted phase shifts provide the multiple output signals with orthogonal code modulation. 12. the radar transceiver processes the at least one down-converted receive signal to obtain, for each of the transmit antennas, a demultiplexed set of digital input signals. 13. the transmit-side extender adjusts the phase-shifts for the multiple output signals multiple times during each chirp. 14. the adjusted phase shifts provide different frequency shifts, different frequency sweep rates, or different code modulations to the multiple output signals. 15. each transmit-side extender includes: a power splitter that splits the respective transmit signal into multiple signal copies; a set of multiple phase shifters each providing an adjustable phase shift for one of the multiple signal copies; and a set of power amplifiers each deriving one of the multiple output signals from an output of a corresponding one of the multiple phase shifters. 16. each of the receive-side extenders includes: a set of multiple phase shifters each providing an adjustable phase shift for one of the multiple input signals; and a power combiner that forms a respective receive signal by combining outputs of the multiple phase shifters. 17. each extender includes an internal memory to store, for each of the multiple input signals, a different sequence of phase shift adjustments. 18. each extender includes an external interface that controls timing for supplying the different sequences from the memory to the multiple phase shifters. 19. the radar transceiver supplies a clock signal to each of the extenders to control timing for suppling the sequences of phase shift adjustments from the internal memory to the multiple phase shifters. 20. the obtaining, applying, and summing are performed by a receive-side extender coupled to a radar transceiver that performs the combining, deriving, and processing.

Embodiments of an integrated circuit that includes a receive extender are described. This integrated circuit includes: N receive (or input) contacts that couple to N receive antennas, where N is a non-zero integer; N phase-adjustment circuits coupled to the N receive contacts, where a given phase-adjustment circuit in the N phase-adjustment circuits is coupled to a given receive contact in the N receive contacts; an N:1 demultiplexer coupled to the N phase-adjustment circuits; an amplifier coupled to the N:1 demultiplexer; an output contact coupled to the amplifier; and a control circuit that controls the N phase-adjustment circuits. Moreover, the integrated circuit is coupled to a second integrated circuit, where the second integrated circuit performs phase and/or frequency shifting of an output signal based at least in part on an oscillator signal. During operation, the integrated circuit receives N receive signals on the N receive contacts. After phase adjusting of the N receive signals using the N phase-adjustment circuits, the integrated circuit combines the N receive signals using the N:1 demultiplexer. Then, the integrated circuit amplifies a combined receive signal using the amplifier and the output signal is provided by the amplifier on the output contact to the second integrated circuit. Furthermore, control signals between the control circuit and a second control circuit on the second integrated circuit are synchronized, and the oscillator signal is not synchronized between the integrated circuit and the second integrated circuit.

Note that the N receive signals may be coherently combined (e.g., by maintaining relative phases of the N receive signals during the combining).

Moreover, the N phase-adjustment circuits may apply different phase adjustments to the N receive signals.

Furthermore, a configuration of the integrated circuit and the second integrated circuit may be different from a cascaded configuration.

Additionally, the integrated circuit may be different from the second integrated circuit.

In some embodiments, the N phase-shift adjustment circuits are implemented in an analog domain.

Note that the second integrated circuit may perform: analog-to-digital conversion (ADC); and signal processing.

Moreover, the integrated circuit may increase a number of receive antennas coupled to the second integrated circuit.

Furthermore, the frequency shifting may be from a band of frequencies in RF to a second band of frequencies that is less than the band of frequencies. For example, the second band of frequencies may be: an intermediate band of frequencies that is greater than DC; or baseband.

Additionally, the second integrated circuit may include a transceiver chip.

Another embodiment provides a third integrated circuit that includes a transmit extender. This third integrated circuit includes: an input contact; a 1:M multiplexer coupled to the input contact, where M is a non-zero integer; M phase-adjustment circuits coupled to the 1:M multiplexer; M power amplifiers coupled to the M phase-adjustment circuits, where a given power amplifier in the M power amplifiers is coupled to a given phase-adjustment circuit in the M phase-adjustment circuits; M output (or transmit) contacts coupled to the M power amplifiers and to M transmit antennas, where a given output contact in the M output contacts is coupled to the given power amplifier; and a third control circuit that controls the M phase-adjustment circuits. Moreover, the integrated circuit is coupled to the second integrated circuit, where the second integrated circuit performs the phase and/or frequency shifting of a transmit signal based at least in part on the oscillator signal. During operation, the third integrated circuit receives the transmit signal on the input contact from the second integrated circuit. Then, the third integrated circuit separates the transmit signal into M transmit signals using the 1:M multiplexer. Moreover, the third integrated circuit phase adjusts the M transmit signals using the M phase-adjustment circuits. Next, the third integrated circuit amplifies the M transmit signals using the M power amplifiers and outputs the M transmit signals on the M output contacts. Furthermore, control signals between the third control circuit and the second control circuit on the second integrated circuit are synchronized, and the oscillator signal is not synchronized between the second integrated circuit and the third integrated circuit.

Note that the M transmit signals may be coherently separated (e.g., by maintaining the phase of the transmit signal in the M transmit signals during the separating).

Moreover, the M phase-adjustment circuits may apply different phase adjustments to the M transmit signals.

Furthermore, a configuration of the second integrated circuit and the third integrated circuit may be different from the cascaded configuration.

Additionally, the third integrated circuit may be different from the second integrated circuit.

In some embodiments, the M phase-shift adjustment circuits are implemented in an analog domain.

Note that the second integrated circuit may perform: ADC; and signal processing.

Moreover, N may be different from M.

Furthermore, the third integrated circuit may increase a number of transmit channels output by the second integrated circuit.

Additionally, the frequency shifting may be from the band of frequencies in the RF to the second band of frequencies that is less than the band of frequencies. For example, the second band of frequencies may be: the intermediate band of frequencies that is greater than DC; or baseband.

In some embodiments, the second integrated circuit may include a transceiver chip.

Another embodiment provides a fourth integrated circuit that includes the receive extender and the transmit extender.

Another embodiment provides a system that includes the second integrated circuit and one or more of: the integrated circuit, the third integrated circuit and/or the fourth integrated circuit.

Another embodiment provides a method for extending an integrated circuit. This method includes at least some of the operations performed by the integrated circuit, the second integrated circuit, the third integrated circuit and/or the fourth integrated circuit.

This Summary is provided for purposes of illustrating some exemplary embodiments, so as to provide a basic understanding of some aspects of the subject matter described herein. Accordingly, it will be appreciated that the above-described features are examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF DRAWINGS

Note that like reference numerals refer to corresponding parts throughout the drawings. Moreover, multiple instances of the same part are designated by a common prefix separated from an instance number by a dash.

DETAILED DESCRIPTION

Figure 1:
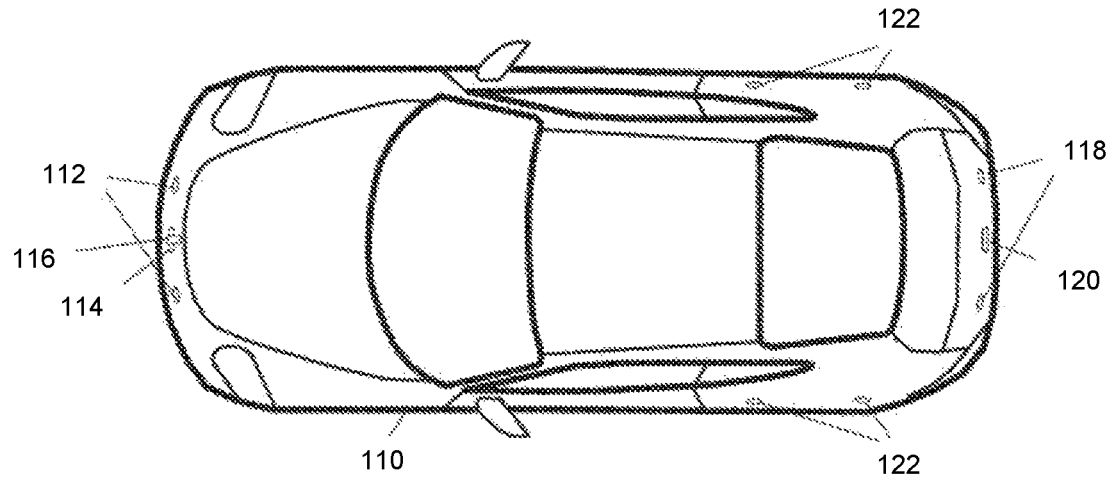
FIG. 1 is a drawing illustrating an example of a vehicle equipped with radar sensors according to some embodiments of the present disclosure.

An integrated circuit that includes a receive extender is described. This integrated circuit may include: N receive contacts that couple to N receive antennas, where N is a non-zero integer; N phase-adjustment circuits coupled to the N receive contacts, where a given phase-adjustment circuit in the N phase-adjustment circuits is coupled to a given receive contact in the N receive contacts; an N:1 demultiplexer coupled to the N phase-adjustment circuits; an amplifier coupled to the N:1 demultiplexer; an output contact coupled to the amplifier; and a control circuit that controls the N phase-adjustment circuits. Moreover, the integrated circuit may be coupled to a second integrated circuit, where the second integrated circuit performs phase and/or frequency shifting of an output signal based at least in part on an oscillator signal. During operation, the integrated circuit may receive N receive signals on the N receive contacts. After phase adjusting of the N receive signals using the N phase-adjustment circuits, the integrated circuit may combine the N receive signals using the N:1 demultiplexer. Then, the integrated circuit may amplify a combined receive signal using the amplifier and the output signal may be provided by the amplifier on the output contact to the second integrated circuit. Furthermore, control signals between the control circuit and a second control circuit on the second integrated circuit may be synchronized, and the oscillator signal may not be synchronized between the integrated circuit and the second integrated circuit.

Moreover, a third integrated circuit that includes a transmit extender is described. This third integrated circuit may include: an input contact; a 1:M multiplexer coupled to the input contact, where M is a non-zero integer; M phase-adjustment circuits coupled to the 1:M multiplexer; M power amplifiers coupled to the M phase-adjustment circuits, where a given power amplifier in the M power amplifiers is coupled to a given phase-adjustment circuit in the M phase-adjustment circuits; M output contacts coupled to the M power amplifiers and to M transmit antennas, where a given output contact in the M output contacts is coupled to the given power amplifier; and a third control circuit that controls the M phase-adjustment circuits. Moreover, the integrated circuit may be coupled to the second integrated circuit, where the second integrated circuit performs the phase and/or frequency shifting of a transmit signal based at least in part on the oscillator signal. During operation, the third integrated circuit may receive the transmit signal on the input contact from the second integrated circuit. Then, the third integrated circuit may separate the transmit signal into M transmit signals using the 1:M multiplexer. Moreover, the third integrated circuit may phase adjust the M transmit signals using the M phase-adjustment circuits. Next, the third integrated circuit may amplify the M transmit signals using the M power amplifiers and may output the M transmit signals on the M output contacts. Furthermore, control signals between the third control circuit and the second control circuit on the second integrated circuit may be synchronized, and the oscillator signal may not be synchronized between the second integrated circuit and the third integrated circuit.

Furthermore, a fourth integrated circuit that includes the receive extender and the transmit extender is described.

By performing the receive extending and/or the transmit extending, these circuit techniques may reduce the cost and complexity of a MIMO radar system that includes the integrated circuit, the second integrated circuit, the third integrated circuit and/or the fourth integrated circuit. For example, the integrated circuit, the third integrated circuit and/or the fourth integrated circuit may be smaller and may consume less power than the second integrated circuit. Moreover, the circuit techniques may improve the performance of the MIMO radar system. Notably, the integrated circuit and/or the fourth integrated circuit may increase the number of receive antennas coupled to the second integrated circuit, and the third integrated circuit and/or the fourth integrated circuit may increase the number of transmit channels output by the second integrated circuit. Consequently, the circuit techniques may enable the use of MIMO and its use in a variety of applications, such as automotive applications.

In the discussion that follows, a vehicle may include: an automobile, a sports utility vehicle, a truck, a motorcycle, a train, an aircraft, a boat, or another type of transportation conveyance. However, in the discussion that follows, an automobile is used as an illustrative example of the vehicle.

Moreover, in the discussion that follows, a vehicle may use one or more types of sensors to perform measurements associated with objects in the surrounding environment. While a wide variety of types of sensors may be used, in the discussion that follows radar sensors are used as an illustrative example. The radar sensors may perform measurements using at least one of a variety of modes of operation (such as pulsed or continuous-wave), and may involve the use of one or more types of modulation (such as amplitude, frequency and/or phase modulation). In some embodiments, frequency-modulated continuous-wave (FMCW) radar is used. Furthermore, transmitted and received radar signals (e.g., having carrier frequencies in a radar band of frequencies, such as between 3 MHz and 100 GHz) may be generated and/or processed in the analog domain and/or the digital domain.

Furthermore, in the discussion that follows, the terms 'approximately' or 'substantially' mean that a value is expected to be close to a stated value. However, there may be minor variations that prevent the values from being exactly as stated. Consequently, anticipated variances, such as 10% differences, are reasonable variances that may occur and are known to be acceptable relative to a stated or ideal goal for one or more embodiments of the present disclosure. Additionally, the terms 'first,' 'second,' 'next,' 'last,' 'before,' 'after,' and other similar terms are used for description and ease of reference purposes only and are not intended to be limiting to any configuration of elements or sequences of operations for the various embodiments of the present disclosure. Note that the terms 'coupled,' 'connected' or otherwise are not intended to limit such interactions and communication of signals between two or more devices, systems, components or otherwise to direct interactions; indirect couplings and connections may also occur.

Figure 2:
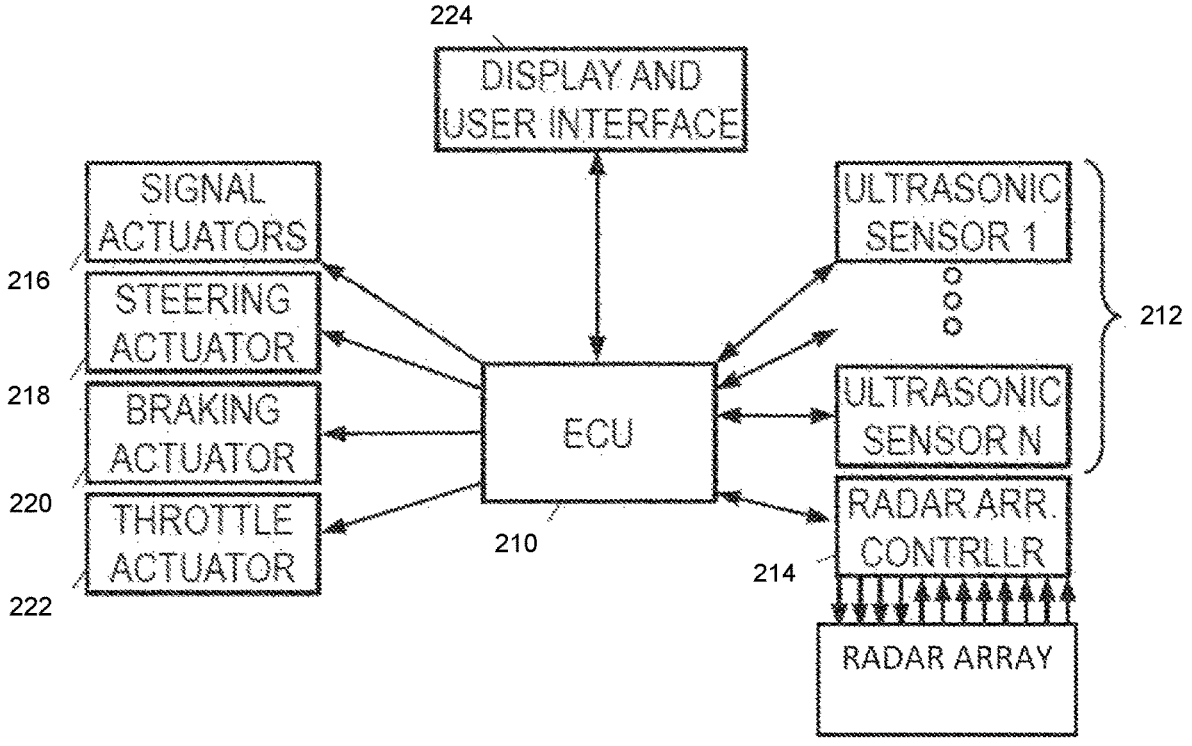
FIG. 2 is a block diagram illustrating an example of a driver-assistance system according to some embodiments of the present disclosure.

We now describe embodiments of the circuit techniques. FIG. 1 presents a drawing illustrating an example of a vehicle 110 equipped with an array of radar antennas, including: antennas 112 for short-range sensing (e.g., for parking assist), antennas 114 for mid-range sensing (e.g., for monitoring stop-and-go traffic and cut-in events), antennas 116 for long-range sensing (e.g., for adaptive cruise control and collision warning), each of which may be placed behind the front bumper cover. Antennas 118 for short-range sensing (e.g., for back-up assist) and antennas 120 for mid-range sensing (e.g., for rear-collision warning) may be placed behind the back-bumper cover. Moreover, antennas 122 for short-range sensing (e.g., for blind-spot monitoring and side-obstacle detection) may be placed behind the car fenders. Each antenna and each set of antennas may be grouped in one or more arrays. Furthermore, each array may be controlled by a radar-array controller 205 (FIG. 2). In some embodiments, a given set of antennas may perform MIMO radar sensing. The type, number, and configuration of sensors in the sensor arrangement for vehicles having driver-assist and self-driving features varies. The vehicle may employ the sensor arrangement for detecting and measuring distances/directions to objects in the various detection zones to enable the vehicle to navigate while avoiding other vehicles and obstacles. While the preceding discussion illustrates vehicle 110 with radar sensors, in other embodiments vehicle 110 may include additional types of sensors, such as LiDAR, an ultrasonic sensor, a camera, etc.

FIG. 2 presents a block diagram illustrating an example of a driver-assistance system. This driver assistance system may include an electronic control unit (ECU) 210 coupled to various sensors 212 and radar-array controller 214 as the center of a star topology. However, other topologies may include serial, parallel, and hierarchical (tree) topologies. Radar-array controller 214 may couple, radio-frequency (RF) frontends, to the transmit and receive antennas (e.g., in antennas 114) to transmit electromagnetic waves, receive reflections, and determine a spatial relationship of the vehicle to its surroundings. Moreover, radar-array controller 214 may couple to carrier-signal generators. In some embodiments, radar-array controller 214 may control the timing and order of actuation of a plurality of carrier signal generators.

In order to provide automated parking assistance, ECU 210 may couple to a set of actuators, such as: a turn-signal actuator 216, a steering actuator 218, a braking actuator 220 and/or a throttle actuator 222. Moreover, ECU 210 may couple to an interactive user interface 224 to accept user input and to display various measurements and system status.

Using user interface 224, sensors, and actuators, ECU 210 may provide: automated parking, assisted parking, lane-change assistance, obstacle and blind-spot detection, autonomous driving and/or other desirable features. During operation of vehicle 110 (FIG. 1), sensor measurements may be acquired by ECU 210, and may be used by ECU 210 to determine a status of vehicle 110. Moreover, ECU 210 may act on the status and incoming information to actuate signaling and control transducers to adjust and maintain operation of vehicle 110. For example, the operations that may be provided by ECU 210 include driver-assist features, such as: automatic parking, lane following, automatic braking, self-driving, etc.

Furthermore, in order to obtain the measurements, ECU 210 may employ a MIMO radar system. Radar systems operate by emitting electromagnetic waves that travel outward from a transmit antenna before being reflected towards a receive antenna. The reflector may be any moderately reflective object in the path of the emitted electromagnetic waves. By measuring the travel time of the electromagnetic waves from the transmit antenna to the reflector and back to the receive antenna, the radar system may determine the distance to the reflector. Additionally, by measuring a Doppler shift of the electromagnetic waves, the radar system may determine a velocity of the reflector relative to vehicle 110 (FIG. 1). When multiple transmit or receive antennas are used, or when multiple measurements are made at different positions, the radar system may determine the direction to the reflector and, thus, may track the location of the reflector relative to vehicle 110 (FIG. 1). With more sophisticated processing, multiple reflectors may be tracked. In some embodiments, the radar system may employ array processing to 'scan' a directional beam of electromagnetic waves and to construct an image of the surroundings of environment around vehicle 110 (FIG. 1). In general, pulsed and/or continuous-wave implementations of the radar system may be implemented.

Figure 3:
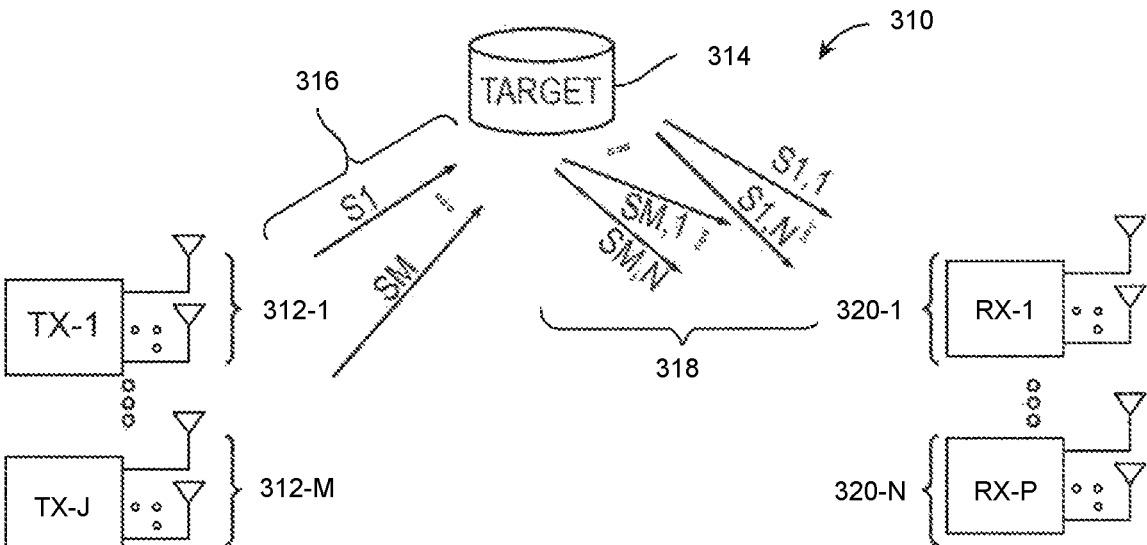
FIG. 3 is a block diagram illustrating an example of a radar system according to some embodiments of the present disclosure.

FIG. 3 presents a block diagram illustrating an example of a radar system 310 having a MIMO configuration, in which J transmitters are collectively coupled to M transmit antennas 312 to send (e.g., concurrently) transmit signals 316, where J and M are non-zero integers. The M possible transmit signals 316 may reflect from one or more reflectors or targets 314 to be received as receive signals 318 via N receive antennas 320 coupled to P receivers, where N and P are non-zero integers. Each receiver may extract the amplitude and phase or travel delay associated with each of the M transmit signals 316, thereby enabling the system to obtain N·M spatially diverse measurements (though only J·P of the measurements may be obtained concurrently). Note that each of the measurements may indicate the distance to multiple targets, and when combined in various ways, may further indicate the direction and/or the velocity of each target. The processing requirements associated with each receiver extracting J measurements can be reduced via the use of time-division multiplexing and/or orthogonal coding. Moreover, the available antennas may be systematically multiplexed to the available transmitters and receivers to collect the full set of measurements for radar imaging.

Figure 4:
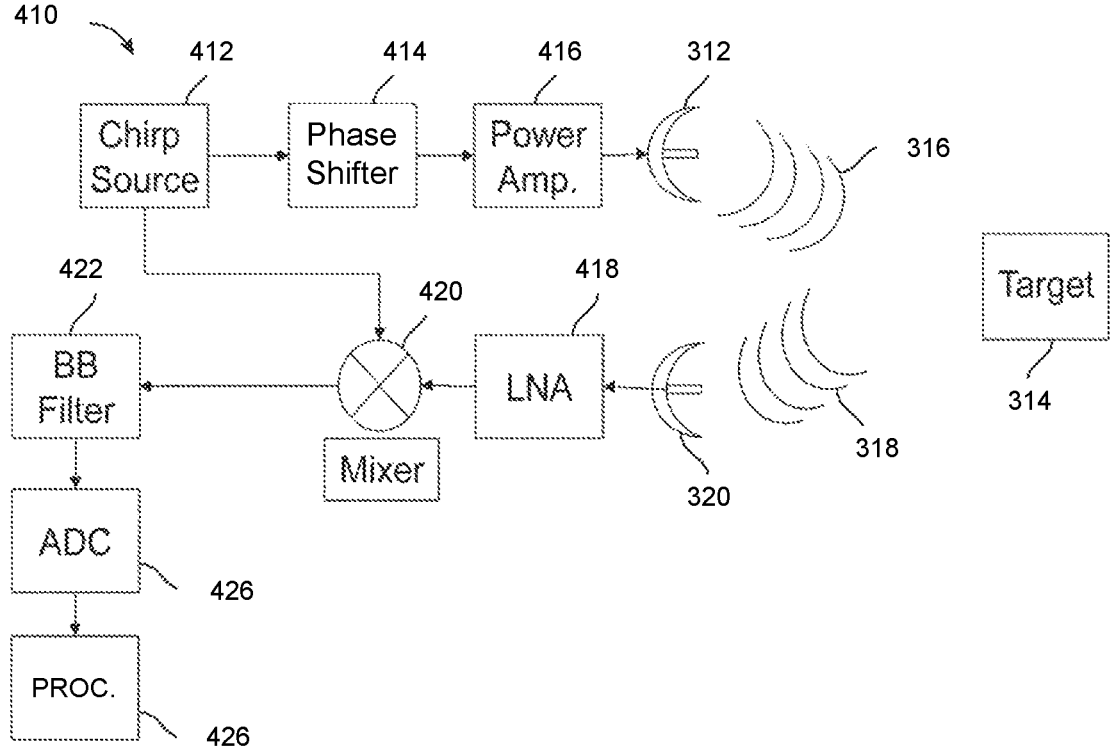
FIG. 4 is a block diagram illustrating an example of a radar system according to some embodiments of the present disclosure.

FIG. 4 presents a block diagram illustrating an example of a radar transceiver circuit 410 (e.g., in radar system 310 in FIG. 3). In some embodiments, radar transceiver circuit 410 is implemented as an integrated circuit in a packaged chip. Radar transceiver circuit 410 may include: a carrier-signal (chirp) generator 412 that converts a local-oscillator (LO) signal into a FMCW signal (such as a signal) with a series of linearly swept frequency chirps), a phase shifter 414 (and, more generally, an encoder circuit, which may implement Doppler code multiplexing), an amplifier 416, and/or transmit antennas 312 which can transmit signals 316 based at least in part on the output of the carrier-signal generator 412. Moreover, radar transceiver circuit 410 may include: receiver antennas 320, a low-noise amplifier (LNA) 418, and/or a mixer 420 (which, in some embodiments, may implement Doppler code multiplexing). Mixer 420 may mix received signals 318 detected by receive antennas 312 with the signal from the carrier-signal generator 412. Furthermore, low-noise amplifier 418 may be used to amplify received signals 318 detected by receive antennas 320. In some embodiments, radar transceiver circuit 410 may include: a sensitivity time controller and equalizer (not shown), a broadband (BB) filter 422, an ADC 424 and/or a processor 426 (e.g., ECU 210 and/or radar-array controller 214 in FIG. 2), which may perform further processing of the received signals (such as a Fourier transform). In some embodiments, processor 426 and low-noise amplifier 418 may be coupled for bi-directional communication.

Additionally, in some embodiments, carrier-signal generator 412 may be coupled to radar array-controller 214 (FIG. 2). Carrier-signal generator 412 may include a chirp generator to create an FMCW signal. The chip rate of carrier-signal generator 412 may be controlled by radar-array controller 214 (FIG. 2). In some embodiments, carrier-signal generator 412 may be deactivated by radar-array controller 214 (FIG. 2) to provide an unmodulated carrier signal. Moreover, carrier-signal generator 412 may be implemented as a local oscillation (LO) signal generator, a fractional-N phase lock loop (PLL) with a ΣΔ controller, or as a direct-digital synthesis generator.

Furthermore, carrier-signal generator 412 may be coupled to transmit antennas 312 through phase shifter 414 and amplifier 416. Carrier-signal generator 412 may be coupled to receiving antennas 312 through mixer 420 and low-noise amplifier 418. Additionally, carrier-signal generator 412 may generate a transmit signal (e.g., a chirp signal). Amplifier 416 may receive the transmit signal from carrier-signal generator 412 and transmit signals 316 corresponding to the transmit signal from carrier-signal generator 412 may be transmitted using transmit antennas 312.

In some embodiments, a radar transmitter may include: a phase rotator, a bi-phase modulator, a variable gain amplifier, a switch, a power amplifier driver, a power amplifier, and/or a digital signal processor (DSP). Moreover, in some embodiments, a radar transmitter may include a digital controller. This digital controller may be included in the DSP or may be a separate component. Furthermore, the phase rotator may be used for digital phase modulation. Additionally, the radar transmitter may use a wave-modulated power amplifier in a digital-envelope modulation technique.

Figure 5:
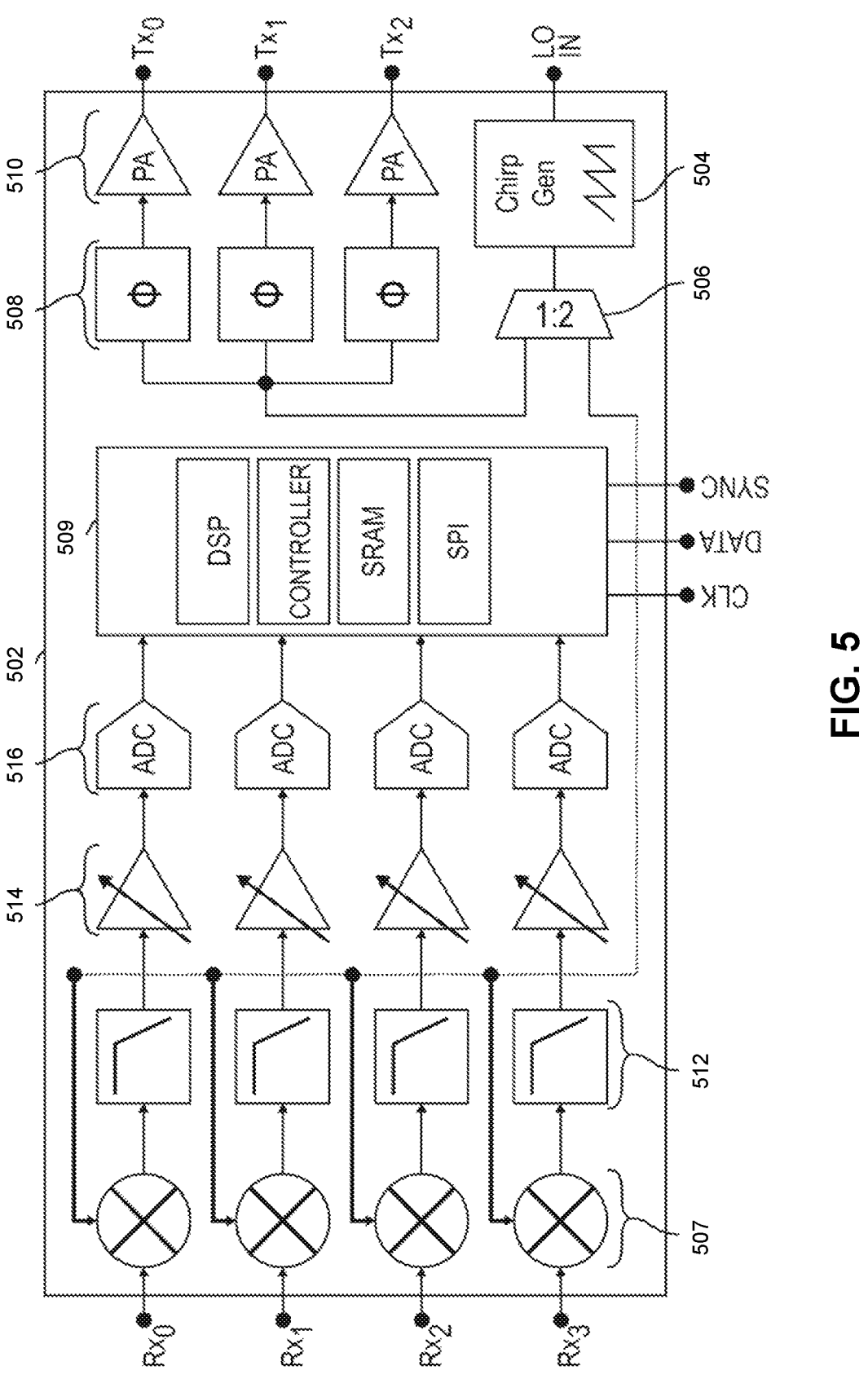
FIG. 5 is a block diagram illustrating an example of a radar transceiver chip according to some embodiments of the present disclosure.

FIG. 5 presents a block diagram illustrating an example of a radar transceiver chip 502 or an 'RF frontend' chip for use in a MIMO radar system. Transceiver chip 502 may include a chirp generator 404 that converts an LO signal into an FMCW signal, such as a signal with a series of linearly-swept frequency chirps. Moreover, a power splitter 506 may split off a portion of the FMCW signal power to supply a copy of the FMCW signal to down-conversion mixers 507. Furthermore, a remainder of the FMCW signal may pass to a set of phase shifters 508, which a controller 509 may use to phase shift the FMCW signal independently for each of the RF outputs.

In some embodiments, the phase shifting may be used in a variety of ways to provide, e.g., coherent beam steering or channel separation to enable virtual beam steering. Channel separation may be provided using orthogonally-coded phase modulation with a different code pattern for each channel. Alternatively or additionally, phase shifting may provide channel separation through the use of different frequency shifts, different frequency sweep rates, and/or spreading codes (e.g., Barker codes, maximum length sequence codes, etc.). The phase modulation may be 1-bit (e.g., bipolar phase shift keying), 2-bit (e.g., quadrature phase shift keying), or higher order (N-bit). Power amplifiers 510 may receive the phase-shifted FMCW signals and drive three transmit signals ($Tx_0$ through $Tx_2$) on output contacts. While the radar transceiver chip is illustrated with three transmit signals, in other embodiments there may be more or fewer transmit signals. The transmit signals may be provided to transmit antennas or, as discussed further below, may be provided to transmit-side extender chips to increase the number of transmit antennas driven from transceiver chip 502.

Transceiver chip 502 may include contacts for obtaining four receive signals ($Rx_0$ through $Rx_3$) from receive antennas or, as discussed further below, from receive-side extender chips to increase the number of receive antennas supported by transceiver chip 502. Down-conversion mixers 507 may multiply the receive signals with a copy of the FMCW signal, converting the receive signals to near baseband frequencies that are passed by low-pass filters 512. Moreover, gain control amplifiers 514 may adaptively adjust signal amplitudes to optimize the use of the dynamic range of ADCs 516. Furthermore, ADCs 516 may digitize the receive signals for processing by controller 509. Controller 509 may be a programmable digital signal processor, with fast memory (e.g., SRAM) and a serial peripheral interface (SPI), thereby enabling it to communicate with other chips in a MIMO radar system.

At the signal frequencies used for automotive radar (e.g., 80 GHz), it may be preferrable to keep the antenna feed lines short in order to minimize attenuation and electromagnetic interference. However, the relationship between the physical size of the transceiver chip and the pitch of the antenna array may make it difficult to keep the antenna feed lines acceptably short once the array size exceeds about seven or eight antennas. When employing additional chips (such as extender chips) that each support a small number of antennas (e.g., 3 or 4), the extender chips may be positioned near the corresponding antennas in order to minimize feed-line length, and inter-chip communications may be, at least in part, protected through the use of amplifiers and additional shielding.

Figure 6:
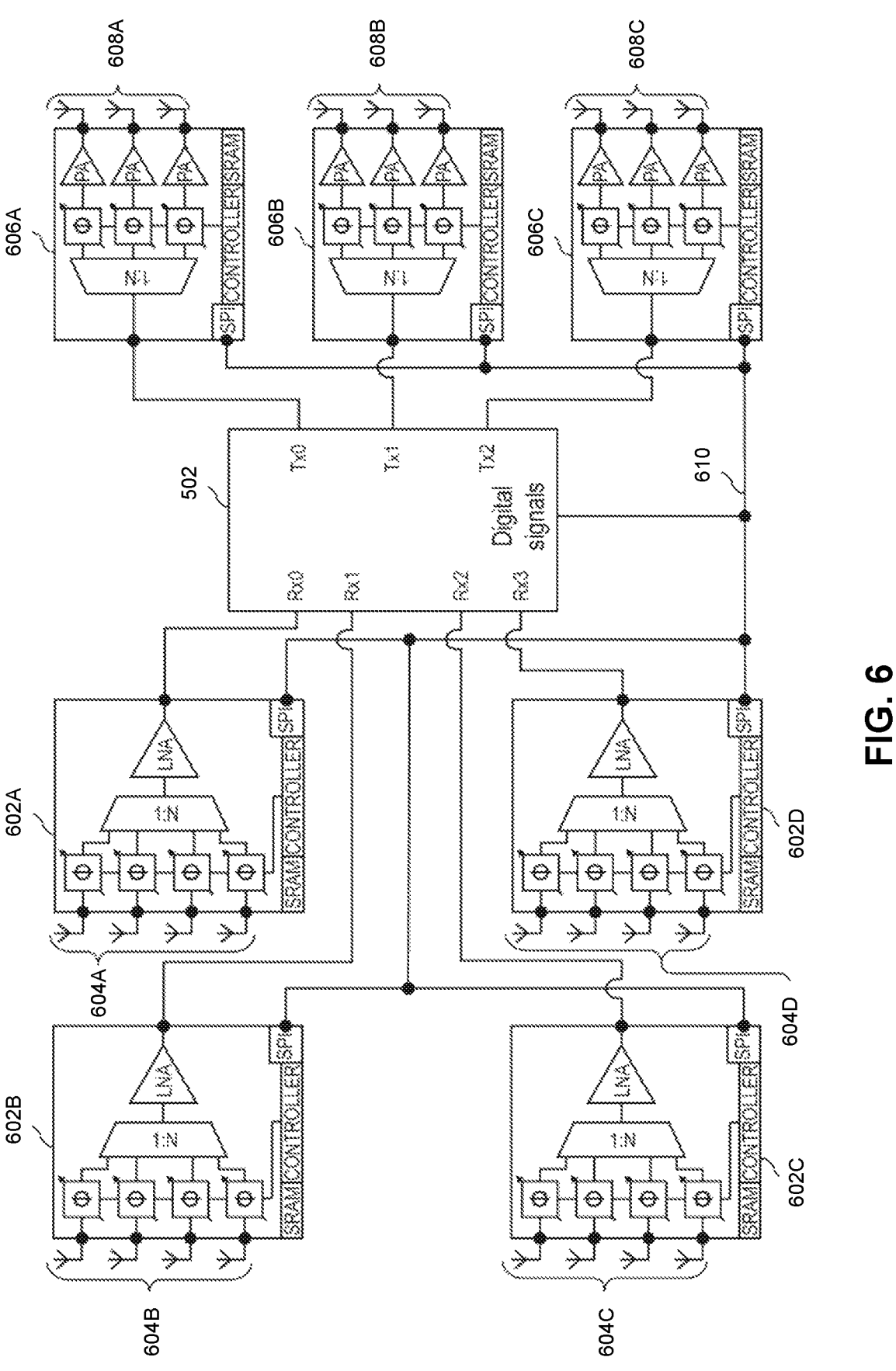
FIG. 6 is a block diagram illustrating an example of a radar system having extender chips according to some embodiments of the present disclosure.

FIG. 6 presents a block diagram illustrating an example of a radar system having extender chips. The extender chips may increase a number of transmitter and receiver antennas supported by a given transceiver chip 502. Notably, each of the four receive signal contacts may be coupled to a given receive-side extender chip 602A-602D. Each of the receive-side extender chips may receive input signals from a corresponding set of receive antennas 604A-604D, may provide them with adjustable phase shifts, and may combine the phase-shifted signals to provide a receive signal to the transceiver chip 502. In FIG. 6, each of the receive-side extender chips may combine four input signals to form a receive signal. However, in other embodiments, the number of input signals may be larger or smaller.

Moreover, each of the three transmit signal contacts of transceiver chip 502 may be coupled to a given transmit-side extender chip 606A-606C. Each of the transmit-side extender chips may convert a transmit signal into multiple output signals to a corresponding set of transmit antennas 608A-608C, and may use controllable phase shifters to phase shift or frequency shift each of the transmit signals by a desired amount and/or to modulate each output signal with a desired channel code. In FIG. 6, each of the transmit-side extender chips may convert a transmit signal into three output signals. However, in other embodiments, the number of output signals may be larger or smaller.

Transceiver chip 502 may be coupled to each of the extender chips by digital control signal lines 610, which may include an SPI bus. Signal lines 610 may enable transceiver chip 502 to program the extender chips with desired phase shifts and/or channel codes, and may enable transceiver chip 502 to control the timing of any transitions in the phase shifts.

While not shown in FIG. 6, the extender chips may be employed in a hierarchical fashion. For example, instead of having the inputs of receive-side extender chip 602A coupled to antennas 604A, each of those inputs may be coupled to additional given receive-side extender chips to increase the number of antennas multiplexed onto the Rx0 channel of transceiver chip 502 from four to sixteen. This can be repeated for each of receive-side extender chips 602B-602D, thereby increasing the total number of receive antennas from 16 to 64. Note that transmit-side extender chips 606A-606C may be similarly coupled to a second level of transmit-side extender chips, thereby increasing the number of supported transmit antennas from 9 to 27. Additional hierarchy layers can be added until limited by, e.g., the processing capabilities of transceiver chip 502.

Figure 7:
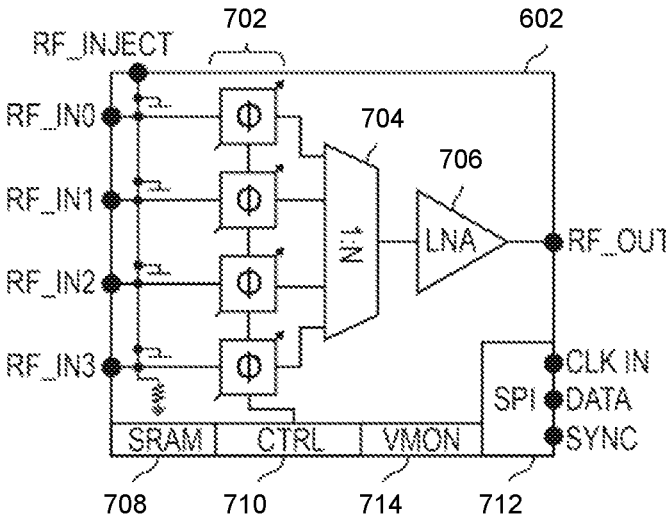
FIG. 7 is a block diagram illustrating an example of an input extender chip according to some embodiments of the present disclosure.

FIG. 7 presents a block diagram illustrating an example of an input or receive-side extender chip 602. This receive-side extender chip may have three input contacts for receive antenna signals (RF_IN1 through RF_IN3). Each input signal may be coupled to one of multiple controllable phase shifters 702, and a power combiner 704 may sum the phase shifter outputs in order to provide a composite receive signal to a low noise amplifier 706. LNA 706 may drive the composite receive signal via an output contact RF_OUT to a downstream chip, such as transceiver 502. Note that receive-side extender chip 602 may include an on-chip controller 710 (or control circuit) for controlling phase shifters 702 using given sequences of adjustable phase shifts from on-chip memory 708. While the timing of the phase shift adjustments may vary, some embodiments may apply a fixed phase shift to each chirp, switching to the next phase shift for the next chirp. This approach may avoid bandwidth expansion of the composite receive signal, but may necessitate the use of multi-chirp measurements to separate the contributions of the various antennas, which may potentially impact time or velocity resolution of measurements. Alternatively or additionally, the phase shift adjustments may be made many times during each chirp in order to provide different frequency shifts, different frequency sweep rates, and/or code modulation to spread the input signal energy across a larger spectrum. While transceiver chip 502 may need to up the digitization rate, multi-chirp measurements may be avoided. In some embodiments, the timing of the phase shift adjustments may be coordinated for the extender chips by transceiver chip 502 via SPI bus 712 or via another shared clock signal line.

In some embodiments, automotive electronics may preferably include circuitry to verify proper operation. Consequently, receive-side extender chip 602 may include an optional supply voltage monitor 714 in order to detect under and over-voltage, and may include an optional test input (RF_INJECT) via which a test signal may be coupled to the antenna input contacts. When the test signal is applied, transceiver chip 502 may verify that the test signal can be detected from each of the antenna inputs.

Figure 8:
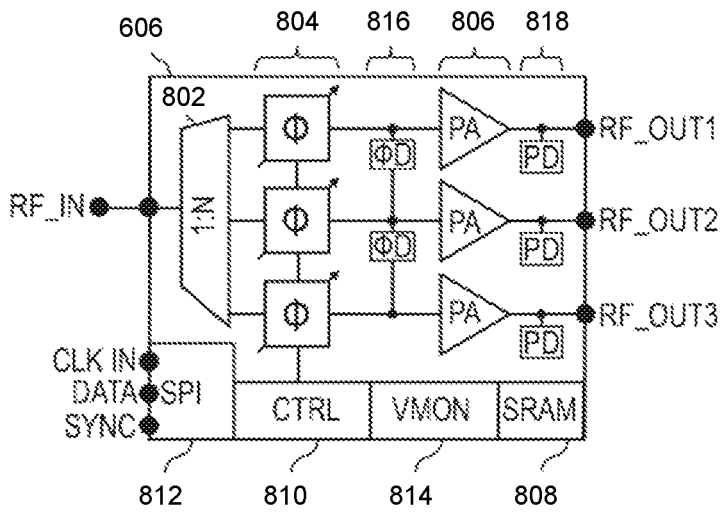
FIG. 8 is a block diagram illustrating an example of an output extender chip according to some embodiments of the present disclosure.

FIG. 8 presents a block diagram illustrating an example of an output or transmit-side extender chip 606. This transmit-side extender chop may have an input contact that accept a transmit signal (RF_IN). A power splitter may split the transmit signal into multiple copies, supplying one to each of multiple controllable phase shifters 804. The output of each phase shifter 804 may be coupled to a given transmit signal contact by a corresponding power amplifier 806. Note that the transmit signal contacts may be suitable for connecting to transmit antennas. Transmit-side extender chip 606 may include an on-chip controller 810 (or control circuit) that controls the phase shifters 804 using given sequences of phase-shift adjustments from on-chip memory 808. As with the receive-side extenders, in some embodiments the timing of the phase shift adjustments may be coordinated by transceiver chip 502 via SPI bus 812 or another shared clock signal line. Moreover, in order to avoid bandwidth expansion, the transmit-side code symbol (phase shift) for each chirp may be kept fixed, e.g., only switching between chirps. Alternatively or additionally, the phase shifters may be used to provide the output signals with different frequency shifts, different frequency sweep rates, and/or different spreading codes.

As with the receive-side extenders, the transmit-side extenders may include circuitry to verify proper operation. For example, an optional supply voltage monitor 814 may detect under or over-voltages potentially affecting operation of the components. Moreover, optional phase-difference detectors 816 may be included in order to compare phases between adjacent phase shifters 804, and optional power detectors 818 may be included in order to monitor the outputs of power amplifiers 806 for proper operation. As described in co-owned patent application U.S. Ser. No. 16/660,370 by inventors Tom Heller, et al., filed 2019 Oct. 22 and entitled "Radar Array Phase Shifter Verification," operation of the phase shifters may be periodically verified by incrementing through each of the possible combinations of phase-shifter settings and verifying that phase-difference detectors 816 measure the expected phase differences. Note that the extender chips may notify transceiver chip 602 of detected faults via the SPI bus.

Figure 9A:
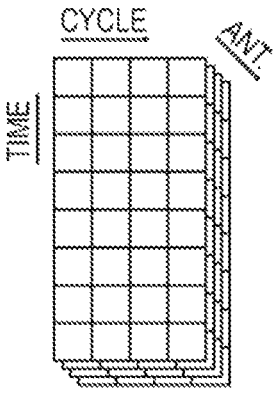
FIGS. 9A and 9B are block diagrams illustrating examples of data cubes representing, respectively, an acquired set of radar measurements and a transformed set of radar measurements according to some embodiments of the present disclosure.
Figure 9B:
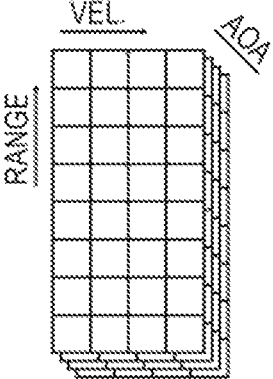

FIGS. 9A and 9B present block diagrams illustrating examples of data cubes representing, respectively, an acquired set of radar measurements and a transformed set of radar measurements. Notably, FIG. 9A illustrates a data cube representing a portion of the digital signal measurements that may be collected by transceiver chip 502. Usually, each chirp may be considered as a measurement cycle. However, with the use of code multiplexing, the measurement cycle may extend over multiple chirps. During a measurement cycle, the RF receiver frontend may digitize and separate the down-converted receive signals from the selected receive antennas, thereby providing a time sequence of digitized receive signal samples. Because of to the chirp modulation, the signal energy reflected by the targets may reaches the receive antennas with a frequency offset that depends on the round-trip travel time (and, thus, on the distance to the target). A Fast Fourier Transform (FFT) of the time sequence collected in a given cycle may isolate the energy associated with each frequency offset, thereby yielding a function of reflected energy versus target range. This operation, which is sometimes referred to as the 'range FFT,' may be performed for each transmit-receive antenna pair in each measurement cycle. The range FFT may yield peaks for each target having a given range.

Note that motion of the target relative to the antenna array may add a Doppler shift to the reflected signal energy. The Doppler shift may be proportional to the relative velocity. While it is usually small relative to the range-induced frequency offset, the Doppler shift may be observable as a change in the phase of the associated frequency coefficients in subsequent measurement cycles. (Recall that FFT coefficients are complex-valued, having both magnitude and phase.) Applying an FFT to the corresponding frequency coefficients in a sequence of measurement cycles may isolate the energy associated with each relative velocity, thereby yielding a function of reflected energy versus target velocity. This operation, which is sometimes referred to as the 'velocity FFT,' may be performed for each range and each transmit-receive antenna pair. The resulting two-dimensional data array may include 'peaks' for each target having a given range and relative velocity.

Moreover, the reflected energy from a given target may reach the individual receive antennas in the antenna array with a phase that depends on the direction of arrival of the reflected energy (which is sometimes referred to as an 'angle of approach'). Applying an FFT to corresponding frequency coefficients associated with a sequence of uniformly spaced antennas may isolate the energy associated with each incidence angle, thereby yielding a function of reflected energy versus angle of approach (AoA). This operation, which is sometimes referred to as the 'AoA FFT,' may be performed for each range and velocity using a given transmit antenna.

Thus, digitized signal measurements arranged in a measurement data cube having its three dimensions representing functions of time, measurement cycle, and antenna position (as shown in FIG. 9A), may be transformed into a target data cube having its three dimensions representing functions of range, velocity, and AoA (as shown in FIG. 8B). Because these operations (channel separation, range FFT, velocity FFT, and AoA FFT) are linear, they may be performed in any order. Furthermore, the FFT operations are independent (meaning that, e.g., the range FFT for a given antenna and cycle may be independent of the range FFTs for other antennas and other cycles, and the velocity FFT for a given range and antenna may be independent of the velocity FFTs for other ranges and antennas), thereby enabling the FFT processing to be parallelized (if desired).

Another desirable processing operation is the separation of signal energy from noise energy. A wide variety of suitable noise suppression or target detection techniques may be used. One technique (which includes many variants) is constant false alarm rate (CFAR) detection. CFAR detection may employ detection-threshold adaptation based at least in part on measurement energy values in a sliding window near or around the measurement being evaluated (which is sometimes referred to as a 'cell under test'). The CFAR technique and its variations offer various tradeoffs between performance and computational complexity by using different statistical approaches to deriving the detection threshold from the measurements within the sliding window. Note that CFAR detection is a non-linear technique because the measurements values below the threshold may be zeroed or ignored, but its position in the processing sequence may nevertheless be modified because the zeroing of frequency coefficients, in general, may not prevent subsequent FFTs from exploiting the relevant phase/frequency information of energy peaks representing targets.

Figure 10:
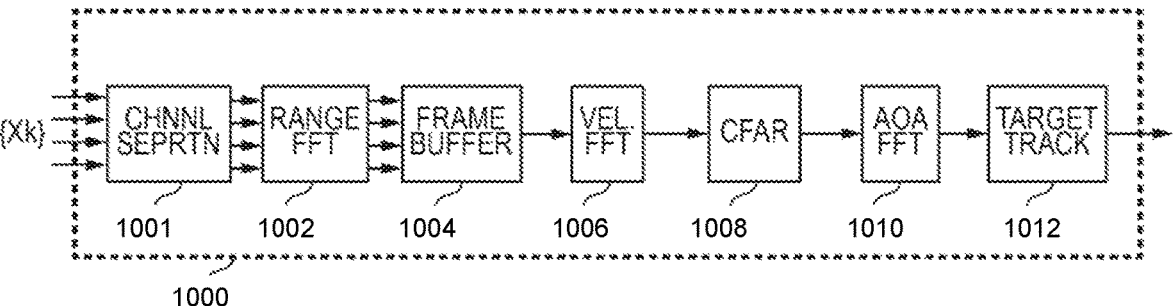
FIG. 10 is a flow diagram of an example data flow in a radar system according to some embodiments of the present disclosure.

FIG. 10 presents a flow diagram of an example data flow 1000 in a radar system, which may be performed by transceiver chip 502 or which may be split between transceiver chip 502 and ECU 210. Notably, as the digitized receive signals $x_k$ are obtained, the controller 509 may optionally use the phase-shift adjustments applied in transceiver chip 502, any of the transmit-side extenders, and/or any of the receive-side extenders to demultiplex the receive-antenna signals and to isolate the contributions from each transmit antenna, thereby separating the channels corresponding to each transmit-receive antenna pair. (If the phase shifts are being used for beam steering, this channel separation may not be needed.) Moreover, controller 509 may perform range FFTs 1002 for each channel, e.g., as the signals are acquired, storing the resulting frequency coefficients as range data in a frame buffer 1004. Frame buffer 1004 may accumulate range data from multiple measurement cycles, thereby enabling controller 509 to then perform velocity FFTs 1006 to produce target range and velocity data for each channel as discussed previously.

A CFAR detector 1008 may operate on the target range and velocity data to remove noise energy below the adaptive threshold. Moreover, CFAR detector 1008 may zero the below-threshold values, leaving only the above-threshold values representing the range and the velocity of potential targets (radar-energy reflectors). In some embodiments, the CFAR-detection process may compress the volume of data by omitting at least some of the below-threshold values, and/or by employing a more-sophisticated data-compression technique to reduce buffer-size requirements and/or bus-bandwidth requirements. Furthermore, controller 509 and/or ECU 210 may perform AoA FFTs 1010 to determine the relative directions associated with potential targets, and may analyze any peaks in the data volume to detect and track 1012 the relative position and velocities of targets relative to the vehicle.

Figure 11:
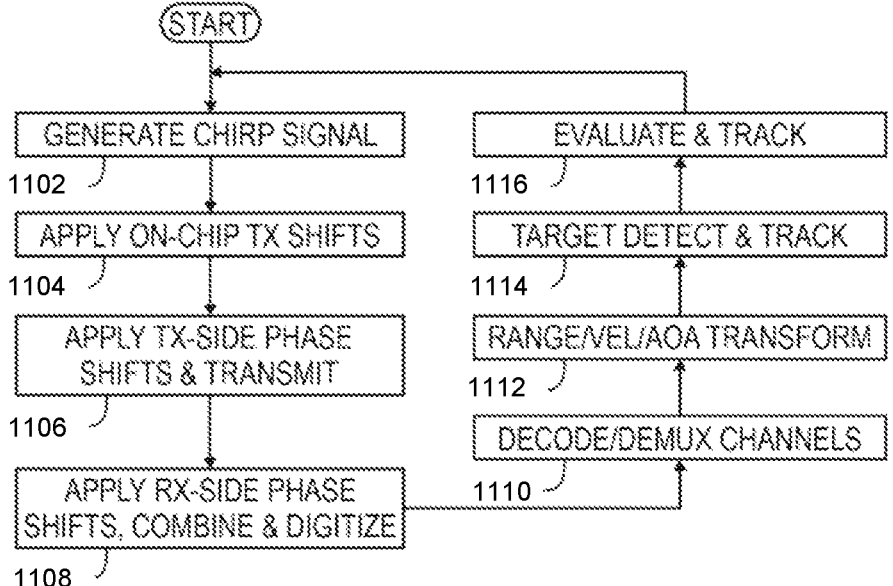
FIG. 11 is a flow diagram illustrating an example of a method for radar detection according to some embodiments of the present disclosure.

FIG. 11 presents a flow diagram illustrating an example of a method 1100 for radar detection according to some embodiments of the present disclosure, which may be performed by a MIMO radar system with extenders. Notably, a chirp generator 504 may generate a chirp signal (operation 1102) having intervals where the signal frequency ramps linearly from a start frequency to an end frequency. The chirp signal may be an upward-chirp, a downward chirp, or even a triangular up-then-down chirp signal. Moreover, the chirp signal may be split into multiple transmit signals. Then, transceiver chip 502 may optionally apply adjustable phase shifts (operation 1104) to the different transmit signals, e.g., to provide phase shifting, beam forming, orthogonal code modulation, and/or frequency shifting. Moreover, the MIMO system may use transmit-side extender chips to split each of the transmit signals (operation 1106) into multiple output signals, which may be further phase shifted with different sequences of phase shift adjustments before being supplied to the transmit antennas.

Next, input signals from the receive antennas may be optionally phase-shifted (operation 1108) to provide phase shifting, beam steering, orthogonal coding, and/or frequency shifting, and the phase shifted signals may be combined to form receive signals for digitization. Furthermore, controller 509 may optionally use the phase shift sequences to separate the signals (operation 1110) from each transmit-receive antenna pair. Additionally, controller 509 and/or ECU 210 may transform the signals (operation 1112) to extract energy peaks indicative of targets, which may then be used to detect and track targets (operation 1114) relative to the vehicle. ECU 210 may evaluate whether the targets require action (operation 1116), such as, e.g., alerting the driver, or automatically braking and steering to avoid a collision, and if so, may act accordingly.

In some embodiments of the method 1100, there may be additional or fewer operations. Moreover, the order of the operations may be changed, and/or two or more operations may be combined into a single operation. While the operations in method 1100 have been described in a sequential fashion for explanatory purposes, at least some of the operations may be implemented in a concurrent or pipelined fashion. Alternatively, at least some of the operations may be performed asynchronously.

Note that the use of receive-side extenders to combine input signals from multiple receive antennas may enable a transceiver to support additional receive antennas. Moreover, the use of transmit-side extenders to conversely split transmit signals may enable the transceiver to support additional transmit antennas. Furthermore, the phase modulators may enable the transceiver to distinguish the individual transmit and receive antenna contributions. In some embodiments, the phase modulators may be implemented as bipolar phase shift keying (BPSK) modulators, quadrature phase shift keying (QPSK) modulators, and/or higher-order phase shift keying modulators.

As discussed previously, MIMO radars employ multiple transmit and receive radio channels to enhance functionality. For example, increasing the number of channels may increase the radar range and angular resolution. However, radar RF frontend chips typically have a finite capacity to host channels in the same die because of tradeoffs, such as RF interconnect losses (toward the antenna) and die-area constraints, complexity and cost. These problems may be addressed by connected multiple chips in a cascade configuration (e.g., a star), which often requires synchronization of signals (such as the LO, clock and control signals).

Figure 12:
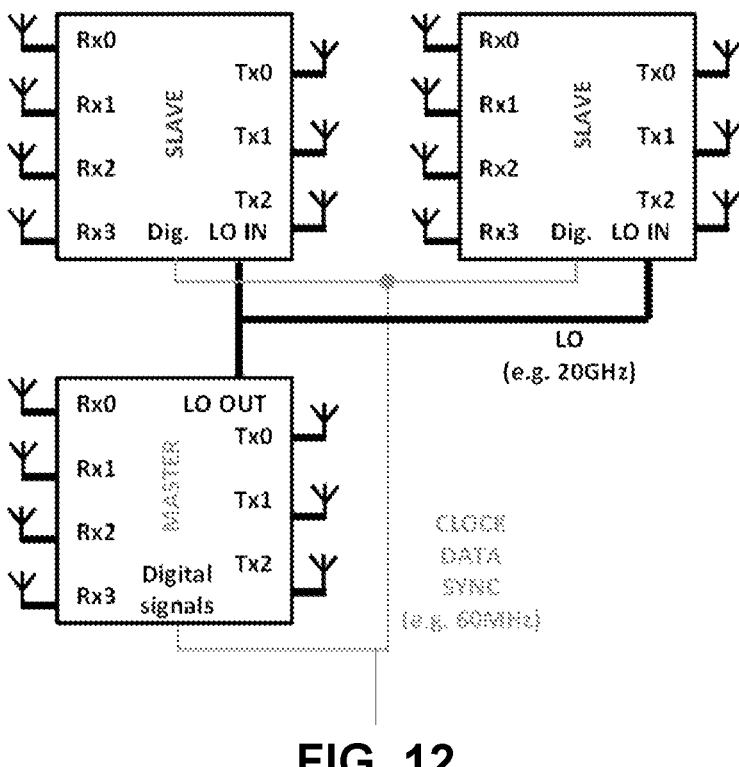
FIG. 12 is a block diagram illustrating an example of cascaded chips according to some embodiments of the present disclosure.

FIG. 12 presents a block diagram illustrating an example of cascaded chips. Notably a single radar chip (or transceiver chip) with four receivers and three transmitters is used as a master with two slave radar chips in a cascaded configuration with 12 receivers and nine transmitters. Note that the master and slave chips in FIG. 12 are identical. Moreover, the master and slave chips in FIG. 12 are synchronized and coordinated, which increases overhead and adds redundant or un-necessary components.

Figure 13:
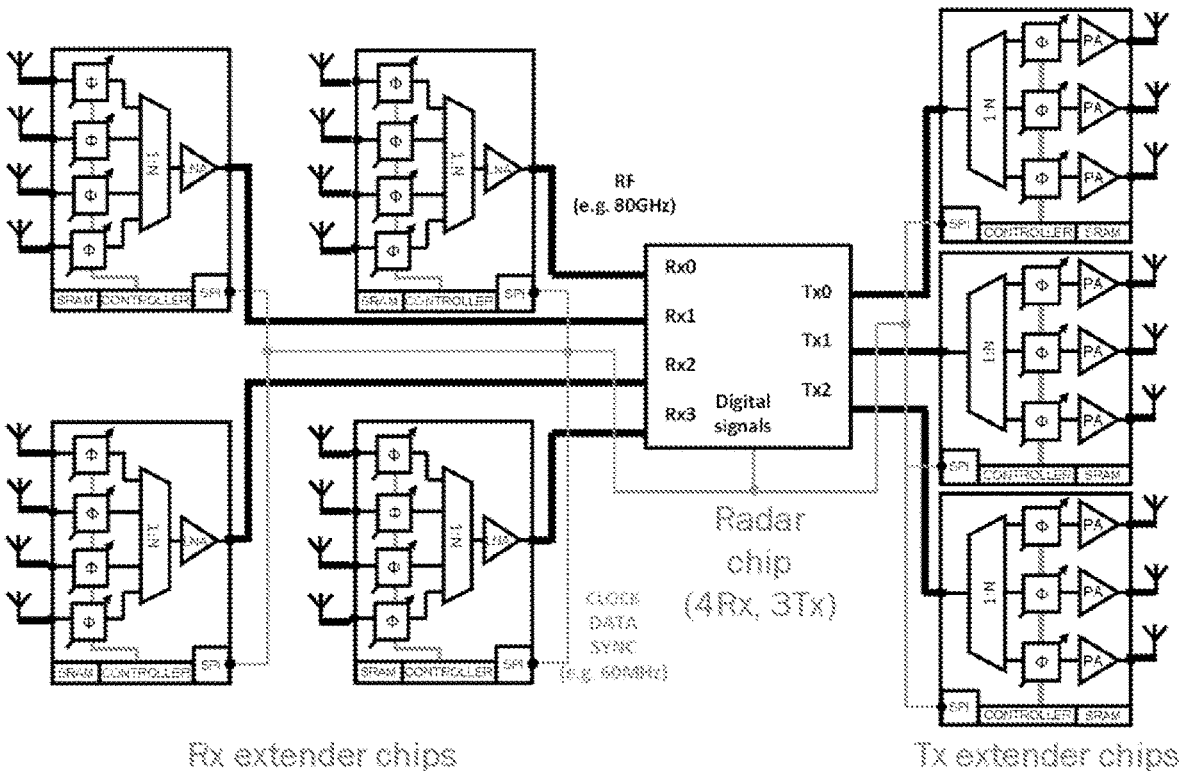
FIG. 13 is a block diagram illustrating an example of a radar chip and extender chips according to some embodiments of the present disclosure.

In contrast, in the disclosed circuit techniques extender chips may be used to extend the number of transmit and receive channels available to a single radar chip. This is shown in FIG. 13, which presents a block diagram illustrating an example of a radar chip (or transceiver chip) and extender chips. The configuration in FIG. 13 increases the number of antennas (such as patch antennas) on the receive side and increases the number of physical channels on the transmit side. Note that this configuration is equivalent to a radar chip with 16 receivers and nine transmitters. Moreover, instead of cascading radar chips by means of LO synchronization (which may involve communication of tens of Gigahertz on a printed circuit board), only the digital control signals may be synchronized (which may involve communication of hundreds of Megahertz on a printed circuit board). Consequently, the extenders in the disclosed circuit techniques may be smaller, cheaper and easier to integrate into a MIMO radar system.

In some embodiments, losses on the RF traces from a chip to the antenna arrays (which may be unavoidable in the embodiments shown in FIGS. 12-13) may be compensated by the amplifiers operating in the extender chips. Moreover, the signal processing for separating the channels may use MIMO for transmission and the previously described MIMO technology for receiving. Furthermore, phase coding may allow beam steering, simultaneous channel operation (such as simultaneous receiving) and/or interference mitigation (as opposed to on/off switching, which may require time-division multiplexing).

Note that the extender chips may not be full replicas of the radar chip. Instead, the extender chips may simpler than the radar chip. For example, a given extender may have a smaller area, may include fewer components, and may use fewer control signals. Moreover, the extender chips may increase the number of channels carrying 'independent' information (as opposed to increasing the number of antennas per channel, which may only provide an increase in the channel gain).

While FIG. 13 illustrates the extender chips including multiplexers, in other embodiments at least the multiplexers from the transmit extender chips may be included on the radar chip. However, in some embodiments, the demultiplexers from the receive extender chips may be included on the radar chip. Moreover, while FIG. 13 illustrates separate transmit extender chips and receive extender chips, in some embodiments a transmit extender chip and a receive extender chip may be included in a single extender chip. Consequently, in some embodiments, instead of the seven chips shown in FIG. 13, there may be fewer of the combined transmit/receive extender chips. Note that the multiplexing in the transmit extender chips and/or the demultiplexing in the receive extender chips may be performed coherently. Furthermore, note that the receive extender chips may not perform frequency shifting. Instead, the frequency shifting or mixing may be performed by the radar chip.

In some embodiments, the circuit techniques provide a transmit-channel extender chip (which is sometimes referred to as a 'transmit extender chip'). Notably, the transmit-channel extender chip may include two signal domains: an RF path, and a digital path. The RF path may include: a 1:N power splitter, N phase shifters, and/or N power amplifiers.

Moreover, the digital path may include: an SPI data interface, SRAM for storing phase profiles, and/or a controller.

Referring back to FIG. 8, when connecting the transmit-channel extender chip to a radar chip, the RF_IN may be coupled to a power-amplifier output of the radar chip (e.g., Tx0). Moreover, each RF_OUT of the transmit-channel extender chip may be coupled to an antenna element.

Figure 14:
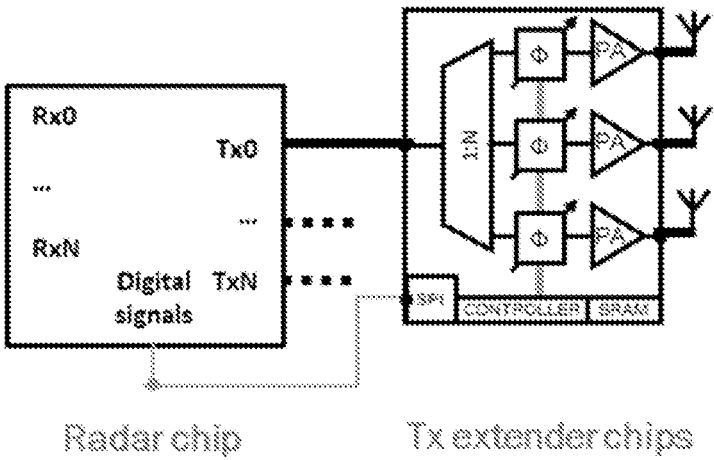
FIG. 14 is a block diagram illustrating an example of a radar chip and a transmit-channel extender chip according to some embodiments of the present disclosure.

During operation of the transmit-channel extender chip, at startup a user may load, via the SPI data interface, initial phase settings, power amplifier bias and an on/off state of the channels. Moreover, a table of phase profiles may be loaded in the SRAM. Then, during radar operation, on every chirp, the transmit-channel extender chip may point to a subsequent row of the lookup table and each extender channel may receive a different phase setting for the purpose of separating each transmit signal. Note that the power-amplifier gain may be selected to compensate for the RF trace loss on a printed circuit board that includes the radar chip and one or more transmit-channel extender chips and for the losses associated with the one or more transmit-channel extender chips. FIG. 14 presents a block diagram illustrating an example of a radar chip and a transmit-channel extender chip.

In some embodiments, the circuit techniques provide a receive-channel extender chip (which is sometimes referred to as a 'receive extender chip'). Notably, the receive-channel extender chip may include two signal domains: an RF path, and a digital path. The RF path may include: N phase shifters, a 1:N power combiner, and/or a low-noise amplifier. Moreover, the digital path may include: an SPI data interface, SRAM for storing phase profiles, and/or a controller.

Referring back to FIG. 7, when connecting the receive-channel extender chip to a radar chip, each RF_in may be coupled to an antenna element. Moreover, the RF_OUT of the receive-channel extender chip may be coupled to an RF input of the radar chip.

Figure 15:
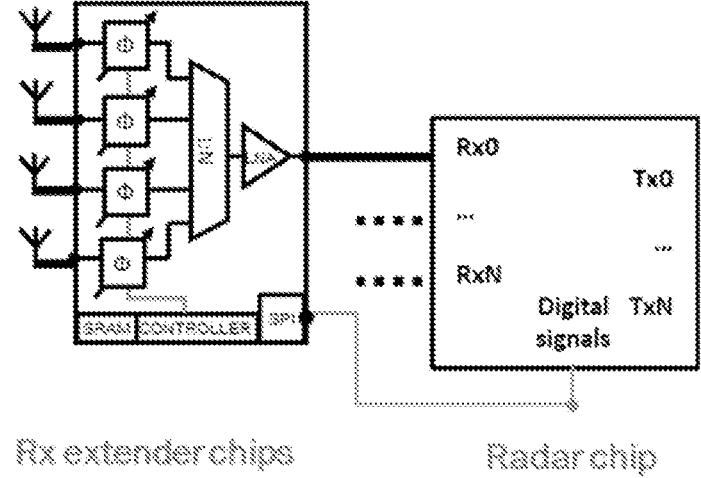
FIG. 15 is a block diagram illustrating an example of a radar chip and a receive-channel extender chip according to some embodiments of the present disclosure.

During operation of the receive-channel extender chip, at startup a user may load, via the SPI data interface, initial phase settings, low-noise-amplifier bias and an on/off state of the channels. Moreover, a table of phase profiles may be loaded in the SRAM. Then, during radar operation, on every chirp the receive-channel extender chip may point to a subsequent row of the lookup table and each extender channel may receive a different phase setting for the purpose of separating each receive signal. Note that the low-noise-amplifier gain may be selected to compensate for the RF trace loss on a printed circuit board that includes the radar chip and one or more receive-channel extender chips and for the losses associated with the one or more receive-channel extender chips. FIG. 15 presents a block diagram illustrating an example of a radar chip and a receive-channel extender chip.

Furthermore, as shown in FIG. 7, note that the combining of receive signals in the receive extender chip may occur after the analog phase shifting. However, in some embodiments, this may be implemented in a digital signal processor after analog-to-digital conversion in the radar chip. In these embodiments, different phase encoding (e.g., to allow receive signals for different channels to be separated) may be used in a receive extender chip. This encoding may occur after the input to the receive extender, but before the analog-to-digital conversion.

As described previously, when used for automotive applications, safety components may be included in the extender chips. For example, as shown in FIG. 8, a given transmit-channel extender chip may include: N power detectors (PD) 818 at the power-amplifier output, and/or N−1 phase detectors (ΦD) 816 between neighboring power amplifiers. Moreover, as shown in FIG. 7, a given receive-channel extender chip may include: an RF inject port and N couplers at the input ports. In some embodiments, the given receive-channel extender chip may include voltage monitor 714 for the power supplies and/or given transmit-channel extender chip may include voltage monitor 814 for the power supplies.

In some embodiments, a transmit-channel extender chip and/or a receive-channel extender chip may include fewer or additional components, positions of one or more components may be changed, two or more components may be combined into a single component, and/or a single component may be divided into two or more components.

The disclosed circuit techniques may increase the size scalability of an RF radar chip with low cost overhead. Moreover, the circuit techniques may improve the performance. For example, positioning a gain stage close to the antenna location may compensate for losses in printed-circuit-board traces, which may increase the signal-to-noise ratio. Furthermore, in some embodiments, extender chips may be used in a cascade configuration, thereby further increasing the channel expansion. Note that receive-channel extender chips and/or transmit-channel extender chips may be implemented in CMOS technology for cost-effectiveness. In some embodiments, the extender chips may be compatible with existing radar chips, including radar chips from multiple, different vendors or manufacturers.

The disclosed integrated circuit and the circuit techniques can be (or can be included in) any electronic device or system. For example, the electronic device may include: a cellular telephone or a smartphone, a tablet computer, a laptop computer, a notebook computer, a personal or desktop computer, a netbook computer, a media player device, an electronic book device, a MiFi® device, a smartwatch, a wearable computing device, a portable computing device, a consumer-electronic device, an access point, a router, a switch, communication equipment, test equipment, a vehicle, a ship, an airplane, a car, a truck, a bus, a motorcycle, manufacturing equipment, farm equipment, construction equipment, or another type of electronic device.

Although specific components are used to describe the embodiments of the integrated circuit and/or the integrated circuit that includes the integrated circuit, in alternative embodiments different components and/or subsystems may be present in the integrated circuit and/or the integrated circuit that includes the integrated circuit. Thus, the embodiments of the integrated circuit and/or the integrated circuit that includes the integrated circuit may include fewer components, additional components, different components, two or more components may be combined into a single component, a single component may be separated into two or more components, one or more positions of one or more components may be changed, and/or there may be different types of components.

Moreover, the circuits and components in the embodiments of the integrated circuit and/or the integrated circuit that includes the integrated circuit may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar. Note that electrical coupling or connections in the preceding embodiments may be direct or indirect. In the preceding embodiments, a single line corresponding to a route may indicate one or more single lines or routes.

As noted previously, at least an integrated circuit may implement some or all of the functionality of the circuit techniques. This integrated circuit may include hardware and/or software mechanisms that are used for implementing functionality associated with the circuit techniques. However, in other embodiments the disclosed circuit techniques may, at least in part, be implemented using discrete components.

In some embodiments, an output of a process for designing the integrated circuit, or a portion of the integrated circuit, which includes one or more of the circuits described herein may be a computer-readable medium such as, for example, a magnetic tape or an optical or magnetic disk. The computer-readable medium may be encoded with data structures or other information describing circuitry that may be physically instantiated as the integrated circuit or the portion of the integrated circuit. Although various formats may be used for such encoding, these data structures are commonly written in: Caltech Intermediate Format (CIF), Calma GDS II Stream Format (GDSII), Electronic Design Interchange Format (EDIF), OpenAccess (OA), or Open Artwork System Interchange Standard (OASIS). Those of skill in the art of integrated circuit design can develop such data structures from schematic diagrams of the type detailed above and the corresponding descriptions and encode the data structures on the computer-readable medium. Those of skill in the art of integrated circuit fabrication can use such encoded data to fabricate integrated circuits that include one or more of the circuits described herein.

While some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both. For example, at least some of the operations in the circuit techniques may be implemented using program instructions that are executed by a processor or in firmware in an integrated circuit.

Moreover, while examples of numerical values are provided in the preceding discussion, in other embodiments different numerical values are used. Consequently, the numerical values provided are not intended to be limiting.

In the preceding description, we refer to 'some embodiments.' Note that 'some embodiments' describes a subset of all of the possible embodiments, but does not always specify the same subset of embodiments.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. An integrated circuit, comprising:

a receive extender; and a transmit extender, wherein the receive extender comprises:

N receive contacts configured to couple to N receive antennas and configured to receive N receive signals associated with the N receive antennas, wherein N is a non-zero integer;

N phase-adjustment circuits, coupled to the N receive contacts, configured to adjust phases of the N receive signals;

an N:1 demultiplexer, coupled to the N phase-adjustment circuits, configured to combine the N receive signals into an output signal; and an output contact, coupled to the N:1 demultiplexer, configured to provide the output signal to a second integrated circuit; and wherein the transmit extender comprises:

an input contact configured to receive a transmit signal associated with the second integrated circuit, wherein the second integrated circuit is configured to perform phase shifting of the output signal, the transmit signal, or both, based at least in part on an oscillator signal;

a 1:M multiplexer, coupled to the input contact, configured to separate the transmit signal into M transmit signals, wherein M is a non-zero integer;

M phase-adjustment circuits, coupled to the 1:M multiplexer, configured to adjust phases of the M transmit signals; and M transmit contacts, coupled to the M phase-adjustment circuits, configured to couple to M transmit antennas and to provide the M transmit signals to the M transmit antennas, wherein control signals for the N phase-adjustment circuits, the M phase-adjustment circuits, or both, are synchronized between the integrated circuit and the second integrated circuit, and the oscillator signal is not synchronized between the integrated circuit and the second integrated circuit.

2. The integrated circuit of claim 1, wherein the N:1 demultiplexer is configured to coherently combine the N receive signals.

3. The integrated circuit of claim 1, wherein the 1:M multiplexer is configured to coherently separate the M transmit signals.

4. The integrated circuit of claim 1, wherein N and M are different.

5. The integrated circuit of claim 1, wherein the N phase-adjustment circuits are configured to apply different phase adjustments to the N receive signals.

6. The integrated circuit of claim 1, wherein the M phase-adjustment circuits are configured to apply different phase adjustments to the M transmit signals.

7. The integrated circuit of claim 1, wherein a configuration of the integrated circuit and the second integrated circuit is different from a cascaded configuration.

8. The integrated circuit of claim 1, wherein the integrated circuit is different from the second integrated circuit.

9. The integrated circuit of claim 1, wherein the second integrated circuit comprises a transceiver chip.

10. A system, comprising:

an integrated circuit, comprising:

a receive extender; and a transmit extender, wherein the receive extender comprises:

N receive contacts configured to couple to N receive antennas and configured to receive N receive signals associated with the N receive antennas, wherein N is a non-zero integer;

N phase-adjustment circuits, coupled to the N receive contacts, configured to adjust phases of the N receive signals;

an N:1 demultiplexer, coupled to the N phase-adjustment circuits, configured to combine the N receive signals into an output signal; and an output contact, coupled to the N:1 demultiplexer, configured to provide the output signal to a second integrated circuit; and wherein the transmit extender comprises:

an input contact configured to receive a transmit signal associated with the second integrated circuit;

a 1:M multiplexer, coupled to the input contact, configured to separate the transmit signal into M transmit signals, wherein M is a non-zero integer;

M phase-adjustment circuits, coupled to the 1:M multiplexer, configured to adjust phases of the M transmit signals; and M transmit contacts, coupled to the M phase-adjustment circuits, configured to couple to M transmit antennas and to provide the M transmit signals to the M transmit antennas; and the second integrated circuit coupled to the integrated circuit, wherein the second integrated circuit is configured to perform phase shifting of the output signal, the transmit signal, or both, based at least in part on an oscillator signal; and wherein control signals for the N phase-adjustment circuits, the M phase-adjustment circuits, or both, are synchronized between the integrated circuit and the second integrated circuit, and the oscillator signal is not synchronized between the integrated circuit and the second integrated circuit.

11. The system of claim 10, wherein the N:1 demultiplexer is configured to coherently combine the N receive signals.

12. The system of claim 10, wherein the 1:M multiplexer is configured to coherently separate the M transmit signals.

13. The system of claim 10, wherein N and M are different.

14. The system of claim 10, wherein the N phase-adjustment circuits are configured to apply different phase adjustments to the N receive signals.

15. The system of claim 10, wherein the M phase-adjustment circuits are configured to apply different phase adjustments to the M transmit signals.

16. The system of claim 10, wherein a configuration of the integrated circuit and the second integrated circuit is different from a cascaded configuration.

17. The system of claim 10, wherein the integrated circuit is different from the second integrated circuit.

18. The system of claim 10, wherein the second integrated circuit comprises a transceiver chip.

19. A method for extending a second integrated circuit, comprising:

by a receive extender in an integrated circuit:

receiving N receive signals from N receive antennas, wherein N is a non-zero integer;

adjusting phases of the N receive signals using N phase-adjustment circuits;

combining the N receive signals into an output signal using an N:1 demultiplexer; and providing the output signal to the second integrated circuit; or by a transmit extender in the integrated circuit:

receiving a transmit signal associated with the second integrated circuit, wherein the second integrated circuit performs phase shifting of the output signal, the transmit signal, or both, based at least in part on an oscillator signal;

separating the transmit signal into M transmit signals using a 1:M multiplexer, wherein M is a non-zero integer;

adjusting phases of the M transmit signals using M phase-adjustment circuits; and providing the M transmit signals to M transmit antennas;

synchronizing control signals for the N phase-adjustment circuits, the M phase-adjustment circuits, or both, between the integrated circuit and the second integrated circuit, and not synchronizing the oscillator signal between the integrated circuit and the second integrated circuit.

20. The method of claim 19, wherein the combining of the N receive signals or the separating of the M transmit signals is performed coherently.

\* \* \* \* \*